United States Patent
Schulze (10) Patent No.: US 6,687,323 B2
(45) Date of Patent: Feb. 3, 2004

(54) METHOD FOR STARTING UP AND MONITORING AN APPARATUS FOR CONTROLLING A BOILING WATER NUCLEAR REACTOR

(75) Inventor: Joachim Schulze, Frankfurt am Main (DE)

(73) Assignee: Framatome ANP GmbH, Erlangen (DE)

( * ) Notice: Subject to any disclaimer, the term of this patent is extended or adjusted under 35 U.S.C. 154(b) by 233 days.

(21) Appl. No.: 09/740,691

(22) Filed: Dec. 19, 2000

(65) Prior Publication Data
US 2001/0016025 A1 Aug. 23, 2001

Related U.S. Application Data (63) Continuation of application No. PCT/EP99/04082, filed on Jun. 14, 1999.

(30) Foreign Application Priority Data
Jun. 19, 1998 (DE) .......................... 198 27 443

(51) Int. Cl.[7] ................................................ G21C 7/00
(52) U.S. Cl. ...................... 376/214; 376/236; 376/237; 376/238
(58) Field of Search ................. 376/236, 237, 376/238, 214, 327

(56) References Cited

U.S. PATENT DOCUMENTS

| | | | |
|---|---|---|---|
| 3,385,758 A | | 5/1968 | Gyorey et al. |
| 4,285,769 A | | 8/1981 | Specker et al. |
| 4,368,171 A | * | 1/1983 | Maruyama et al. ......... 376/217 |
| 4,717,528 A | * | 1/1988 | Meyer et al. ............... 376/237 |
| 5,217,678 A | * | 6/1993 | Fukasawa .................... 376/237 |
| 5,293,411 A | * | 3/1994 | Miyamoto et al. .......... 376/210 |

FOREIGN PATENT DOCUMENTS

DE   1 589 824   12/1972

OTHER PUBLICATIONS

Japanese Patent Abstract No. 54–129290 (Kiguchi), dated Jun. 10, 1979.

* cited by examiner

Primary Examiner—Michael J. Carone
Assistant Examiner—R Palabrica
(74) Attorney, Agent, or Firm—Laurence A. Greenberg; Werner H. Stemer; Ralph E. Locher (57) ABSTRACT

A safe start-up of a boiling water reactor is achieved when two conditions are adhered to and monitored when the control rods are being moved out of the core: First, the drive of a control rod should be activated only when the directly and diagonally adjacent control rods remain at rest simultaneously, and, second, when all the directly adjacent control rods are still in the fully moved-in initial position.

7 Claims, 7 Drawing Sheets

METHOD FOR STARTING UP AND MONITORING AN APPARATUS FOR CONTROLLING A BOILING WATER NUCLEAR REACTOR

CROSS-REFERENCE TO RELATED APPLICATION

This is a continuation of copending international application PCT/EP99/04082, filed Jun. 14, 1999, which designated the United States.

BACKGROUND OF THE INVENTION

Field of the Invention

The invention relates to a method for starting up and monitoring a boiling water nuclear reactor and to an apparatus for controlling a boiling water nuclear reactor.

When a nuclear reactor is started up, the neutron flux level, which is proportional to the reactor power output generated by nuclear fission, is initially increased from the neutron flux emission level at about $10^{-9}$ of the rated power output until the heating power output is reached. The latter amounts, for example, to about $10^{-3}$ of the rated power output. In this intermediate range of the reactor power output, the increase in the neutron flux density causes virtually no change in the thermal conditions in the reactor core, that is to say, in particular, the temperatures of the nuclear fuel, so that there are virtually no reactivity feedback effects which could influence the rate of increase in the neutron flux density. It is only above this intermediate range, that is to say in the percentage range of the reactor power output (lowest power output range), that a reactivity feedback corresponding to the reactivity coefficients of the reactor core commences due to the then noticeable heating of the nuclear fuel and to the resulting introduction (delayed by the amount of the fuel time constant) of energy into the coolant and, as a rule, brings about a constant slowing of the power output increase until it has come to a complete standstill.

The increase in the neutron flux density through the many decades of the intermediate range is brought about by the setting of a slightly supercritical core state. The effective multiplication factor of the core assembly $k_{eff}$ is therefore raised slightly above 1. This purpose is served by control rods, the neutron absorption action of which is reduced in a controlled manner by metered movement out of the core. The neutron flux density increases according to an exponential function after the supercritical core state has been reached. The rate of increase may be characterized by specifying the so-called reactor period. The reactor period is the timespan in which the neutron flux density in the core changes by the factor e=2.718 . . . .

The neutrons released by nuclear fission are predominantly "prompt" neutrons which are released immediately by the fissioned core. A small proportion consists of "delayed neutrons" which originate from unstable follower decay cores.

During a normal start-up operation, the excess reactivity of the core (that is to say, that part of the effective multiplication factor $k_{eff}$ which exceeds the value 1) is set in such a way that the delayed neutrons maintain the determining influence on the rate of increase in the neutron flux density. In order to ensure good controllability, it is customary to carry out the start-up in such a way that the reactor period amounts to more than 30 seconds. The control rods are therefore moved out correspondingly slowly, so that the multiplication factor is always kept only slightly in the supercritical range. To be precise, when the nuclear reactor is being started up, the excess reactivity could otherwise be so great that the rate of increase in the neutron flux density is determined solely by the prompt neutrons, with their very rapid generation sequence, and the delayed neutrons lose any influence on the rate of increase. This reactor state is designated as "prompt critical". The associated reactor period is well below 1 second. The start-up operation then changes to an "excursion" in which, depending on the excess reactivity, the rated value of the reactor power output may be exceeded briefly, before the power output is absorbed as a result of inherent reactivity feedback. When excursions occur, therefore, the increase in power output is not absorbed in the lowest power output range, unless the start-up operations are subprompt critical.

This gives rise to the general object of controlling and monitoring the outward movement of the control bars during start-up, in such a way that the neutron flux (and consequently the reactor power output) is increased in a controlled manner only and, for example, the probability of excursions is reduced or, if possible, eliminated.

Whether an individual control rod can be drawn quickly, slowly or not at all, without the effective multiplication factor being changed to too great an extent, depends on the current configuration of the control rods and on the neutron flux which is caused thereby and to which the control rod is exposed. If the local neutron flux is low at the location of this control rod, because a large number of control rods in its vicinity are still in the initial position (fully retracted into the core) and therefore shield the respective control rod due to their own absorption capacity, then the control rod is only of little effectiveness and can be moved out, without the reactivity conditions of the core being changed greatly.

If, by contrast, all the control rods in the vicinity of this control rod are in the final position (fully moved out of the core), the control rod has its highest effectiveness.

The active fuel elements used for generating energy are arranged in the reactor core, with longitudinal axes parallel to one another, along a cross-sectional plane of the reactor core which is perpendicular to their longitudinal axes, in a pattern forming a regular grid structure with rectangular or square meshes. At the same time, they stand in the meshes of the grid-shaped pattern in such a way that in each case four fuel elements form a square cell, in the center of which is located a control rod movable in the axial direction. Fuel elements at the edge of the core, which are left over when these square "control cells" are formed from four fuel elements arranged around a control rod, are not taken into account in this pattern. Excursions can occur only as long as the power output is clearly below 5% of the rated power output of the nuclear reactor. The invention affords two restrictive criteria which are adhered to when the control rods are moved out until this upper limit of the start-up range is reached. These restrictions may even be incorporated into the planned program by means of which the control rod drives are activated; there may also be provision, however, for utilizing these criteria in order to monitor the start-up operation. In particular, an apparatus in which these criteria are installed may precede or overrule the activation of the control rod drives.

With these and other objects in mind there is provided, in accordance with the invention, a method of starting up a boiling water nuclear reactor with a reactor core having a plurality of control rods distributed about a cross section of the reactor core in a two-color checkerboard pattern in which each square is assigned a control rod, and wherein the control rods are moved into the reactor core in a shutdown state of the reactor and are moved at least partially out of the reactor core during a start-up of the reactor, the method which comprises:

defining a first configuration, in which simultaneously moved control rods are assigned to squares of different color in the checkerboard pattern, and/or a second configuration, in which virtually half the control rods are moved completely or partially out of the reactor core and fully moved-in control rods are assigned to squares of different color; and moving the control rods out of the reactor core under the following restrictions in order to reach a reactor power output upper limit limiting a start-up range:

a) move a given control rod completely or partially out of the reactor core only when all directly or diagonally adjacent control rods remain at rest; and b) as long as the reactor power output upper limit is not yet reached and a predetermined minimum number of the control rods are not yet moved virtually completely out of the reactor core, all the control rods which in each case are directly adjacent to a completely or at least partially moved-out control rod remain moved in completely.

In other words, the invention proceeds from a method for starting up a boiling water reactor having a reactor core, over the cross section of which control rods are distributed in a pattern which corresponds to a two-color checkerboard and in which each square of the checkerboard is assigned to a control rod, the control rods being moved into the reactor core in the shutdown state of the reactor and being moved at least partially out of the core during start-up. According to U.S. Pat. No. 3,385,758 (see German patent DE 1 589 824 B2), only control rods which correspond to squares of the same color should be simultaneously inserted or drawn out in the reactor. At the same time, these control rods are in each case drawn out fully in groups, but no control rods which are diagonally adjacent to one another should be drawn simultaneously. These criteria are very strict and do not always allow the control rods to be employed optimally.

In accordance with the invention, by contrast, the method according to the invention also runs through a configuration, in which simultaneously moved control rods are assigned to squares of different color in the checkerboard pattern, and/or a configuration, in which virtually half the control rods are moved completely or partially out of the reactor core and fully moved-in control rods are assigned to squares of different color.

To be precise, according to the invention, in order to reach a reactor power output upper limit limiting a start-up range, a control rod should be moved completely or partially out of the core only when all the control rods which are directly or diagonally adjacent to it remain at rest. Moreover, all the control rods which are directly adjacent to a completely or at least partially moved-out control rod remain moved in completely, until the upper limit of the start-up range of the reactor is reached or a predetermined minimum number of control rods are moved virtually completely out of the reactor core.

This prevents critical ranges from occurring, in which a decrease in the absorber material, caused by the control rods being moved out, may trigger an excessive increase of thermal neutrons which leads to an excursion. This will be the case when the neutron flux is locally damped considerably even by an individual control rod, for example because the adjacent control rods are already completely or at least partially removed from the reactor core and this control rod is then also removed from the reactor core. The removal of the control rod could then trigger locally a considerable increase in the neutron flux, which entails the risk of an excursion. Consequently, during the start-up, only control rods should be moved which have low effectiveness in terms of the magnitude and distribution of the neutron flux. A movement of the control rods into the core, such as, for example, during an emergency reactor shutdown, is not impeded, but there is a controlled block against the movement out of the reactor core of those control rods in the immediate vicinity of which so many control rods have already been removed completely or at least partially from the reactor core that the removal of a further control rod will result in a local excessive increase in neutron density.

At the same time, according to the invention, high flexibility is provided which, by a more general choice of restrictions, makes it possible to have a method according to the above-mentioned U.S. Pat. No. 3,385,758 or German patent DE 1 589 824 B2, which, however, also runs through other configurations which disturb the checkerboard pattern.

Moreover, according to the invention, in order to reach a reactor power output upper limit limiting a start-up range, according to a first restriction only those control rods are moved completely or partially out of the reactive core, control rods directly or diagonally adjacent to which are not likewise in movement. What is achieved thereby is that the reactivity of an entire region in the reactor core is not changed too quickly as a result of adjacent control rods being moved out simultaneously, which would make it easier for an excursion to form. However, this criterion allows the fuel rods of such a region to be drawn in succession. Then, for example, the effectiveness of a control rod would be increased due to the fact that all eight adjacent control rods are drawn in succession.

The drawing of this last control rod would then change the neutron flux considerably; moreover, this highly effective control rod would be subjected to substantially higher load.

In order to avoid this, the effect of a second restriction is that directly adjacent control rods also cannot readily be drawn in succession, but only when an increased neutron flux already prevails in the entire reactor core, because a predetermined minimum number of control rods are already drawn out completely or the reactor has in any case already reached the power output upper limit defining the start-up range. In this state, an excursion can no longer occur for physical reasons. In this situation, a control rod needs to be considered as partially or completely moved out when it is moved more than 5 cm out of its initial position corresponding to the fully moved-in state. The moved-out state may also be defined accordingly.

For this purpose, preferably, a command to move out a control rod which is directly or diagonally adjacent to a control rod moving out at this moment is suppressed according to the first restriction and the movement of all the control rods is additionally interrupted. This prevents the situation where excessive flux changes may occur in the reactor core while an already enabled step of the start-up program is taking place. At the same time, the instantaneous safe state of the reactor core is preserved, that is to say the reactor is maintained in a stable state.

The first restriction may also be advantageous beyond the start-up range, that is to say in the power output mode. By contrast, the second restriction would prevent the reactor from being capable of being fully utilized. This restriction applies, at all events, as long as less than half, preferably less than half a number just below half, of the control rods are moved virtually completely out of the reactor core.

Preferably, the second restriction is canceled as soon as at least the minimum number of control rods have moved virtually completely out of the reactor core. The power output mode, which in any case cannot trigger any excursions, is subsequently controlled or regulated without this restriction.

Advantageously, the second restriction is canceled even when at least the reactor power output upper limit limiting the start-up range is reached. Preferably, the upper limit of the start-up range is approximately 5% of the rated power output of the nuclear reactor. Even after the upper limit is exceeded, the reactor is sufficiently heated and power output excursions can no longer occur.

It is customary not to move the control rods out of the reactor core individually in succession, but in groups. What may be achieved thereby is that, in each case, a desired geometry is established for the neutron flux and the power output rises, in broad regions of the reactor core, in a distribution which is uniform in a cross-sectional plane perpendicular to a longitudinal axis of a control rod. For example, the regular pattern formed by the control rods in the cross-sectional plane of the reactor core may be divided into rows and columns and be based on a pattern which corresponds to a two-color checkerboard. When the control rods are being drawn, it is then possible in each case to refer to control rods which correspond to squares of the same color. As long as the control rods on the squares of the second color are left in their initial position, the second restriction is fulfilled. It is thereby possible, whilst adhering to the first restriction, to activate in succession states which in each case lead to a higher neutron flux which is distributed in a desired way over the reactor core. For this purpose, the squares of the first color may be combined into subgroups and in each case the rods of a subgroup be moved simultaneously a little way (or completely) out of the core. The corresponding division and activation of the control rods determine in each case the operational "movement sequence" which, as a rule, is controlled by a program by means of a so-called "movement sequence computer". Any (possibly manual) control of the control rods may, however, also be monitored on the basis of similar considerations.

The invention therefore also relates to the start-up of a boiling water nuclear reactor, in which control rods are distributed over the cross section of the reactor core in a pattern corresponding to a regular grid with square meshes, the control rods being movable in each case via a control rod drive from an initial position, which corresponds to the control rod moved completely into the reactor core, into a final position, which corresponds to the control rod moved completely out of the reactor core, and, during start-up, simultaneously in each case at most some control rod drives being activated and other control rod drives being interlocked. According to the invention, in the interlocking of the control rod drives, monitoring is carried out to ensure that, firstly, the control rod drives of control rods which are directly or diagonally adjacent to one another cannot be activated simultaneously, and that, secondly, in the case of each control rod which is no longer in the initial position, the drives of the directly adjacent control rods cannot be activated before a predetermined minimum number of control rods are in the final position or the reactor power output reaches an upper limit predetermined for the start-up operation.

In a two-color checkerboard pattern, the squares diagonally adjacent to a square of the first color have the same color in each case. The first criterion already monitors to ensure that the start-up is commenced only with control rods which are not adjacent. For each such rod, monitoring is also subsequently carried out to ensure that, in a region which comprises at least a plurality of control rods adjacent to one another, the drives of the control rods are monitored in two groups which are distributed over the region according to the differently colored squares of a checkerboard, the drives of one group remaining interlocked and at most the drives of the other group being activatable. The two monitoring rules make it possible for all the control rods of a group to be drawn out of the reactor core in steps, and the number of control rods which must first remain in their initial position is the smallest when the individual regions overlap one another to produce a uniform two-color checkerboard pattern covering the entire core. This makes it possible to have particularly clear movement sequences allowing a rapid start-up without the risk of excursions. Finally, in this way, virtually half the control rods are removed from the reactor core and consequently the second criterion is canceled. The control rod drives of the other group are then no longer blocked, and movement sequences which may also include the remaining control rods can be initiated for the power output range above the start-up range. If the minimum number is set somewhat below half the number of control rods present, then even individual control rod drives may fail, without obstructing the cancellation of the second condition. The uniform heating of the reactor core and the smooth transition into the power output mode are, in practice, not obstructed thereby.

Further advantageous modifications of the monitoring method are derived in a similar way from the above-described advantageous variants of the method for starting up the boiling water reactor.

With the above and other objects in view there is also provided, in accordance with the invention, an apparatus for controlling a boiling water nuclear reactor, comprising:

a plurality of control rods distributed over a reactor core of the reactor in a pattern corresponding to a two-color checkerboard, wherein each square of the checkerboard is assigned a control rod;

each control rod having a control rod drive for moving the control rod between an initial position and a final position;

a control rod movement computer connected to the control rod drives for controlling an outward movement of the control rods; and a monitoring stage connected to the computer, the monitoring stage permitting one of a configuration in which simultaneously moved control rods are assigned to squares of different color in the checkerboard pattern, and a core configuration in which virtually half the control rods are moved completely or partially out of the reactor core and still fully moved-in control rods are assigned to squares of different color, the monitoring stage being programmed to:

a) define for each the control rod selected to be moved out a first blocking zone in which all the drives for the control rods directly or diagonally adjacent to a selected the control rod cannot be activated; and b) define, for each control rod no longer in the initial position, a second blocking zone in which all drives of the control rods directly adjacent to the respective control rod that is already no longer in the initial position cannot be activated during a start-up mode.

In other words, the novel apparatus for controlling a boiling water nuclear reactor contains control rods which are distributed over the reactor core of the reactor according to a pattern which corresponds to a two-color checkerboard and in which each square of the checkerboard is assigned a control rod, each control rod being capable of being moved out from an initial position into a final position by means of a control rod drive. A control rod movement computer controls the outward movement of the control rods. Moreover, according to the invention, a monitoring stage is provided, which permits a configuration, in which simultaneously moved control rods are assigned to squares of different color in the checkerboard pattern, and/or a configuration, in which virtually half the control rods are moved completely or partially out of the reactor core and still fully moved-in control rods are assigned to squares of different color, and which, firstly, defines for each control rod selected to be moved out a first blocking zone, in which all the drives for the control rods directly or diagonally adjacent to the selected control rod are covered and cannot be activated, and, secondly, in the case of each control rod which is virtually no longer in the initial position, defines a second blocking zone, in which all the drives of the control rods which are directly adjacent to this control rod already no longer in the initial position are covered and cannot be activated. Preferably, the first blocking zone consists only of the directly or diagonally adjacent control rods or drives; the second group preferably consists correspondingly only of the directly adjacent control rods or drives.

It is conceivable, in principle, to have, as movement sequences for the movement of the control rods into and out of the reactor core, a multiplicity of programs (running partially automatically) which in each case define the corresponding activation of the control rod drives (and, if appropriate, of further actuators or peripherals, for example coolant pumps). Taking into account the physical data of the reactor core, a virtually optimal movement program is composed and stored in the movement computer, often with the aid of a physics computer which in each case during a reloading of the fuel elements is fed with the predetermined reactivity distribution of the core and with similar physical parameters, the individual program steps of said movement program being enabled manually and/or automatically by means of feedbacks from actuators or of actual quantities measured in the reactor core. The reactor can thereby be transferred into the power output mode in steps.

In order, during the control of the boiling water reactor, to allow only desirable transitional states (in particular, to avoid excursions in the start-up range of the reactor), the monitoring stage, for example a specific structural unit, is connected between the control rod movement computer and the drives of the control rods. This monitoring unit is independent of the control rod movement computer and monitors adherence to the first and second blocking zones in which the drives for the control rods cannot be activated. In general, however, it is also possible to integrate a corresponding monitoring stage into the computer or its software.

Advantageously, the drives of the control rods can in each case be selected and activated by means of a selection signal, while, whenever selection signals for a first control rod and for a second control rod located in the first blocking zone of this first control rod are present at one moment, the drives of the two control rods are interlocked by means of the monitoring unit. Consequently, adjacent control rods cannot be moved out of the core and there can be no region with a greatly increased neutron flux which could lead, for example, to a power output excursion. Preferably, with the interlocking of the drives of the first and of the second control rod, the selection signals of all the control rod drives are annulled. The reactor therefore dwells in a state without the risk of excursions, for example until the operating personnel again enables a control rod movement sequence which can become effective likewise only after corresponding monitoring.

Preferably, a program for selecting and activating the control rod drives of the reactor can be activated in the control rod movement computer. If two drives are selected at the same moment, the control rod of one of the selected drives being located in the first blocking zone of the control rod capable of being moved out by the other selected drive, the already activated program is also capable of being annulled, together with the selection of the two drives, by means of the monitoring unit. This prevents the situation where, for example, a fault emanating from a program for controlling the movement sequence of control rods could induce follow-up faults in the movement sequence controlled by the program. After the annulment of all the selections and of the program operating at that particular moment, for example, the operating personnel can initiate a new movement sequence by hand or start a new movement sequence program. If the selection of a control rod drive is annulled by the monitoring unit, this drive is advantageously blocked in such a way that the respective control rod can no longer be moved in the direction of its final position outside the reactor core; inward movement is not prevented in this case.

In order to allow flexible movement sequences of the control rods of the reactor outside the start-up range of the reactor, the monitoring of every second blocking zone of a control rod can be canceled by means of a power output signal which indicates a reactor power output which is above an upper limit for the start-up range, in particular above 5% of the rated power output. It is also advantageous if the monitoring of every second blocking zone of a control rod can be canceled by means of position signals which indicate that a predetermined minimum number of control rods are virtually in their final position. The neutron flux is then already high in the entire reactor core and the reactor is heated to an extent such that the reactivity feedback inherent in the fuel has a sufficiently stabilizing action and a transfer to the normal power output mode can be made.

Advantageously, this minimum number is at most equal to half the total number, preferably just below the total number of control rods, so that possible component failures (for example, the failure of a limit switch) are acceptable and further movement sequences can be initiated for the control rods, without the restrictions caused by the second blocking zone of each control rod.

The methods for starting up and monitoring and the apparatus for controlling a boiling water nuclear reactor essentially prevent the occurrence of excursions in the start-up range of the nuclear reactor, but have high flexibility.

Thus, so-called group selection monitorings are possible, in which each control rod belongs in each case to only one group. The four control rods diagonally adjacent to it then belong to a second group, two control rods directly adjacent to it and located diametrically opposite to one another belong to a third group, and the other two control rods directly adjacent to it belong to a fourth group. Starting from a "white" square of the first group, all four diagonally adjacent squares are therefore likewise "white" and belong to the second group. However, the four directly adjacent squares belong to two different groups, specifically the third and the fourth group. In this case, always only control rods of the same group should be moved simultaneously, but all the control rods either of all the "white" squares or all the "black" squares must first remain in the initial position. In this case, there may be provision for all the control rods of one group to be first brought into the final position in succession or simultaneously, before the next group is moved.

The invention, however, is more flexible and, although, by the first restriction, preventing control rods diagonally or directly adjacent to one another from being moved simultaneously, nevertheless advantageously makes it possible, according to the second restriction, to provide movement sequences in which a first control rod is first moved out only partially and subsequently at least one diagonally adjacent control rod is moved out before the first control rod is brought ultimately into its final position.

To be precise, it is sufficient that, in each row of control rods located directly adjacent to one another, there is always in each case, between two control rods to be moved out of their initial position, at least one control rod which is also left in the initial position, the same applying to each transverse row, perpendicular to these longitudinal rows, of control rods located directly in succession. A uniform checkerboard pattern covering the entire core is obtained when, in the start-up mode, in each case one control rod allowed to move out alternates with exactly one control rod to be left in the initial position; however, the invention also provides patterns in which two or more control rods left in the initial position can individually stand directly next to one another, and the control rods first left in the initial position also commence to be moved out only when the power output of the core has already reached said upper limit of the start-up range and/or a sufficient number of control rods have been brought into their final position.

This flexibility also makes it possible to have, in addition to planned control rod movement sequences, such as, for example, the start-up of the reactor, special operational actions, such as, for example, a change of movement sequence in the power output mode, control rod tests during the loading of the reactor core or scram time determinations for control rod groupings not conforming to the movement sequence, without the restrictions according to the invention having to be bypassed.

Other features which are considered as characteristic for the invention are set forth in the appended claims.

Although the invention is illustrated and described herein as embodied in a method for starting up and monitoring and apparatus for controlling a boiling water nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
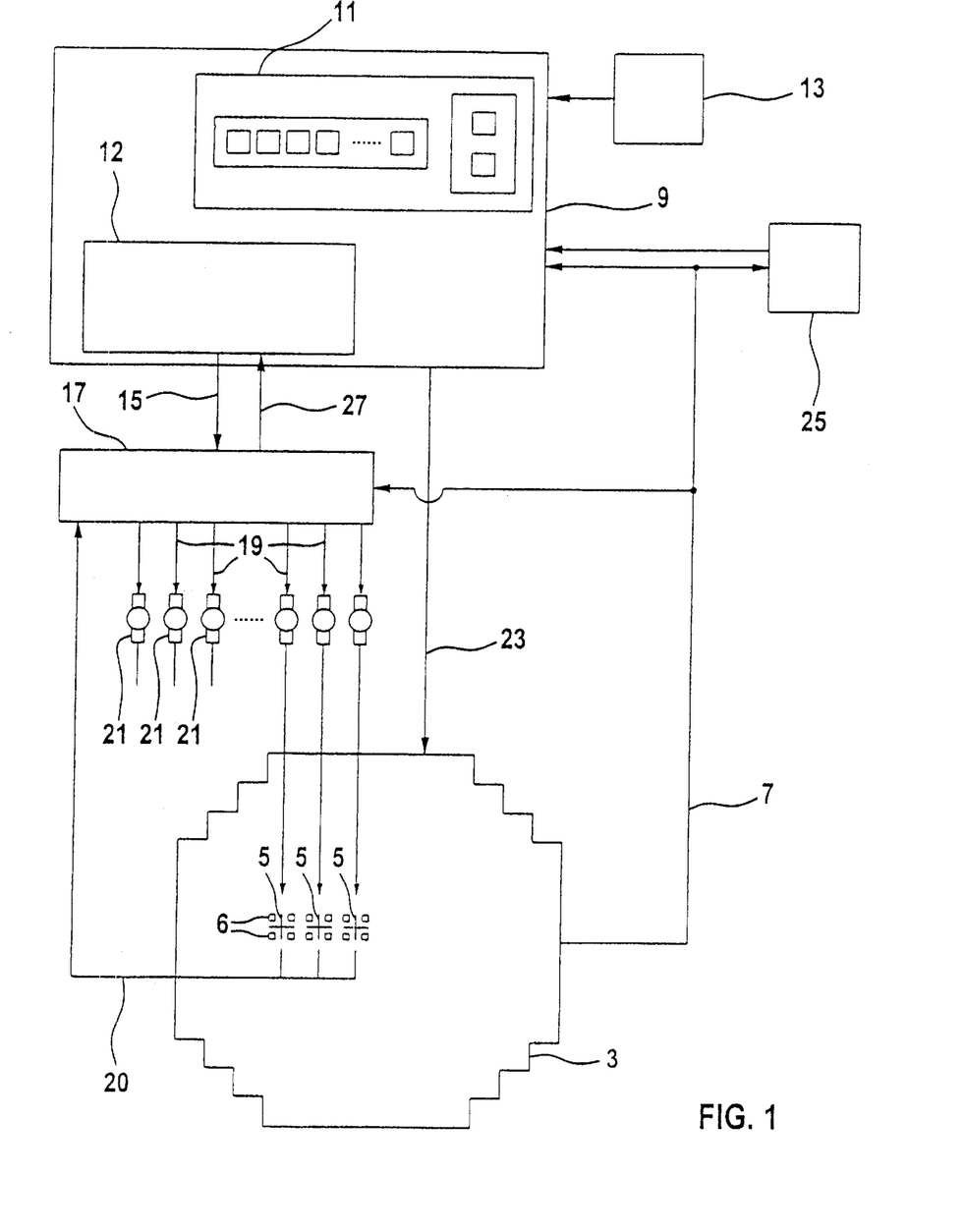
FIG. 1 is a diagram of an apparatus for controlling a nuclear reactor.

Referring now to the figures of the drawing in detail and first, particularly, to FIG. 1 thereof, there is shown a diagrammatic illustration of an apparatus 1 for controlling a boiling water nuclear reactor. The reactor has a reactor core 3 and control rods 5, only three of which are shown for the sake of simplicity in the illustration. Each control rod 5 has a cruciform cross section and is surrounded in each case by four fuel elements 6 which are located in the four quadrants of a cell assigned to the control rod.

The illustration does not show the measuring members customary for operating the reactor (for example, γ or neutron detectors distributed about the reactor core) and peripherals (for example, cooling-water pumps), which transmit signals with corresponding measured values and feedbacks via data lines 7 to a control and management system 9, in which the most important operating data (for example, the actual value of the reactor power output or of the neutron flux) are indicated on a control desk 11, on which enabling and control commands can also be entered (for example, via an up/down switch for raising or lowering a power output desired value).

A manual control 13 makes it possible to carry out special measures (for example, control rod tests), but normal operation is program-controlled via a movement computer 12 which feeds the corresponding activating lines 19 for the control rod drives 21 via a selection line 15. The peripherals, too, can be controlled or regulated by the control and management system 9 via control lines 23.

The configuration of the core and other basic data of the reactor (for example, the distribution of variously enriched and spent fuel elements which are used at the start of an operating cycle) are filed in a physics computer 25 which determines the suitable movement sequences for the power output mode and also the start-up mode. The individual steps of the program are coordinated and controlled by the movement computer 12, a monitoring stage ensuring that only those control rod drives 21 are activated in which movements running in the direction from the initial position to the final position of the control rods and a corresponding position of the control rods are compatible with one another.

This monitoring stage may be integrated in the computer as software, and, for safety reasons, this software should overrule, as a final check, both the movement sequence determined according to a program of the movement computer 12 and the manual control.

Figure 2:
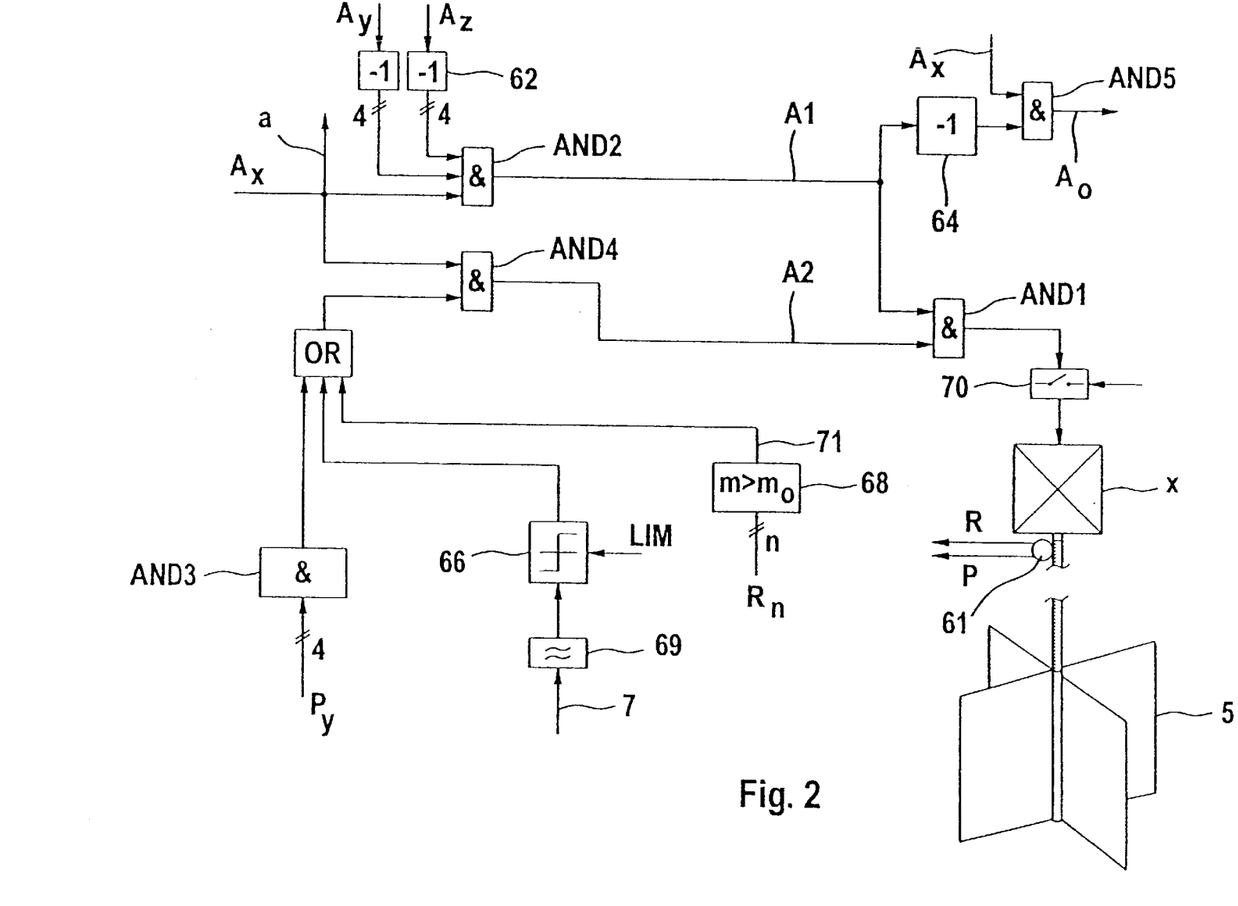
FIG. 2 is a diagram of a hardware connection in the selection line of a control rod.

FIG. 1 illustrates a specific monitoring unit 17 which is implemented by hardware and the functioning of which is explained diagrammatically in FIG. 2 with regard to one of the control rods.

The cruciform control rod 5 is capable of being moved in the axial direction by means of its drive X via a shank. A position detector 61 emits an initial-position signal P or a final position signal R when the control rod 5 is moved virtually completely into the core or out of the core. In this case, deviations of up to 5 cm from the initial state or final state are still acceptable. An activating signal $A_x$, which is also supplied by an output a to circuits, corresponding to those of FIG. 2, for the other control rod drives, activates the drive X only when two conditions are fulfilled, which are interlinked by means of corresponding monitoring signals A1 and A2 and an AND gate AND1:

a) Neither a directly nor a diagonally adjacent control rod is moved. Starting from a checkerboard pattern with white and black squares, four "black" control rods or, if the control rod is located at the edge, two or three "black" control rods are directly adjacent to a "white" control rod and can be designated by Y. Correspondingly, one to four other "white" control rods Z are diagonally adjacent to the "white" control rod. When a control rod is activated by means of a binary signal "1", the corresponding activating signals $A_Y$ and $A_Z$ of all the adjacent control rods Y and Z are inverted by means of NOT elements 62, and the activating signal $A_X$ of the control signal is blocked by the AND gate AND2, even when only one of the control rods X and Y is activated simultaneously and is active.

b) All the directly adjacent control rods, that is to say all the rods Y, are still virtually in the initial position.

Accordingly, the position signals $P_y$ of all the rods Y are linked in an AND gate AND3, the output signal of which enables or, if appropriate, blocks the activating signal via an AND gate AND4.

Whether the condition a) has led to a blocking of the drive X can be established by means of an AND gate AND5, to which the activating signal $A_x$ is supplied directly and the activating signal A1 is supplied via a NOT element 64. In this way, a feedback signal $A_o$ is formed, which resets all the activations by the movement computer via a feedback line 27 (FIG. 1) and also cancels the movement sequence activated in the movement computer itself.

As a result, all the drives are blocked and the control rods cannot be moved out any farther. Instead, they can only be moved into the core, for example because a non-illustrated safety apparatus has detected an inadmissibly increased neutron flux or an excursion and initiates an emergency reactor shutdown.

The condition b) is canceled as soon as a corresponding actual value of the reactor power output—the value is picked up on the line 7 (FIG. 1)—exceeds a limit value LIM (for example, 5% of the nominal power output) predetermined for the upper limit of the start-up range. A corresponding limit-value element 66 is linked to the output of the gate AND3 via an OR gate OR which precedes the gate AND4 for enabling the activating signal $A_x$.

However, the second condition is also canceled when the position signals $R_n$ of all the control rods (total number n) indicate that the number n of control rods which are located virtually in the final position is above a minimum number $m_o$ (query 68). This minimum number $m_o$ is smaller than $n_o/2$ (half of the total number n). The query 68 is therefore also switched to the input of the OR element OR.

Furthermore, a smoothing element 69 indicates means which prevent the signal A2 from being enabled in the case of brief increases in power output. Instead, for example in the case of an excursion, the self-stabilization of which entails such a rapid rise in power output, a safety switching apparatus 70 must make it possible for all the control rods to be moved in quickly.

When the reactor is being started up, the control rod configurations belonging to the program steps of the start-up program can be enabled in succession, within the start-up program activated in the movement computer 12, by the operating personnel. The selection line then transmits the selected and enabled movement sequence to the monitoring stage 17 which then, via the lines 19, activates the corresponding drives 21 (or blocks them if the control rod selections are inadmissible).

Figure 3:
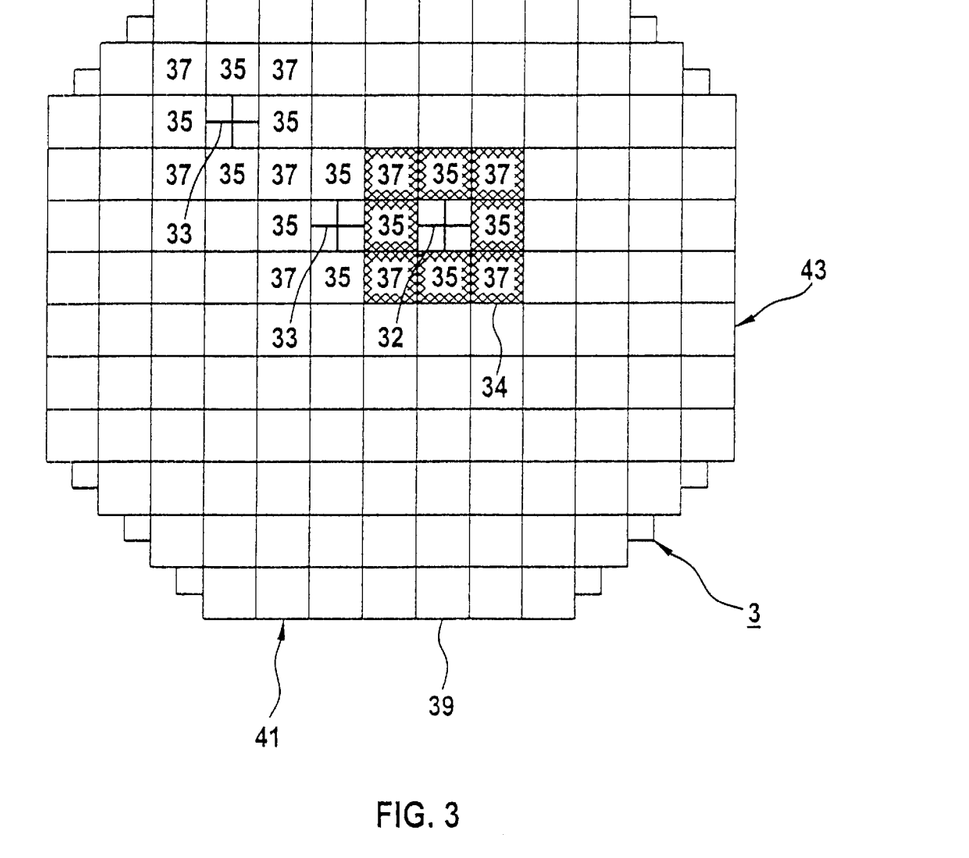
FIG. 3 is a diagram of the cross-sectional area of a reactor core with some of the fuel elements and control rods arranged in a regular grid and with a first blocking zone.

FIG. 3 shows a cross-sectional area of the reactor core, which is perpendicular to a longitudinal axis of a control rod 32 moving out and in which the control rods of the reactor are arranged in a regular pattern 39. The pattern 39 covers the cross-sectional area, shown, of the reactor core 3 in a grid-like manner and leads to an arrangement of the control rods, of which two further control rods 33 are also illustrated by way of example, in transverse rows 41 and longitudinal rows 43 in the manner of a matrix (checkerboard).

A first blocking zone 34 is defined in the monitoring unit 17 for each control rod by means of specific logic unit corresponding to FIG. 2. As regards the control rod 32, this first blocking zone 34 comprises the four directly adjacent control rods (designated by Y in FIG. 2) and the four diagonally adjacent control rods (designated by Z in FIG. 2). If, therefore, the control rods 32 and 33 are drawn simultaneously, the blocking zones belonging to them consist of the directly adjacent control rods 35 and of the diagonally adjacent control rods 37. If the control rod movement computer 12 selects a control rod 35 or 37 directly or diagonally adjacent to a control rod moving out, the monitoring unit 17 suppresses this command and simultaneously blocks all the control rod drives 21 of all the control rods moving out; the control rods 32 and 33 just moving out are therefore also stopped.

Figure 4:
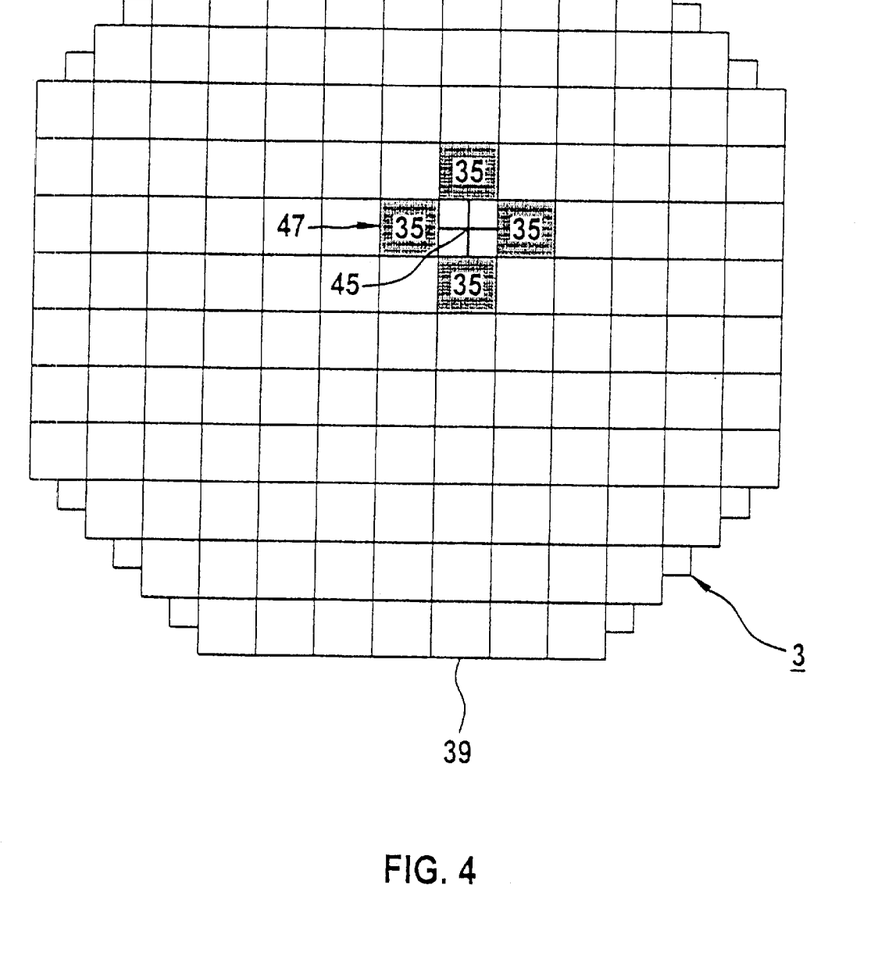
FIG. 4 is a similar view of a cross-sectional area of a reactor core with fuel elements and control rods arranged in a regular grid and with a second blocking zone of an individual control rod.

FIG. 4 illustrates the cross-sectional area of the reactor core 3 from FIG. 3, with a control rod 45 already no longer moved completely into the core and with the matrix-like pattern 39. In the start-up range of the reactor, the monitoring unit 17 defines, for each control rod 32 not moved completely into the reactor core, a second blocking zone 47 (filled in gray) which consists of all the directly adjacent control rods 35. Control rods 32 considered not to be moved completely into the core are all those which are moved at least 5 cm out of their initial position in the direction of the final position (that is to say, outside the reactor core 3). The information on the position of each individual control rod is received by the monitoring unit 17 via the signal line 20 (FIG. 1) to which is applied the so-called move-out length signal S which indicates the length by which a control rod has moved out of its initial position in the direction of the final position and which corresponds to the position signals P and R in FIG. 2.

This second blocking zone 47 around each control rod 32 which is not moved in completely is annulled by the monitoring unit 17 only when the signal line 20 or 71 indicates that a minimum number $m_o$ of control rods 32 are in their final position outside the reactor core 3. This minimum number $m_o$ is just below half of all the control rods in the reactor core 3. Consequently, control rods which are adjacent to a control rod 32 not completely moved into the core can be moved out of the reactor core 3 only when virtually half of all the control rods have already moved out of the reactor core 3. On account of the conditions mentioned, however, there is then a configuration in which the control rods 35 which have remained in the reactor core 3 have only limited control rod effectiveness.

Figure 5:
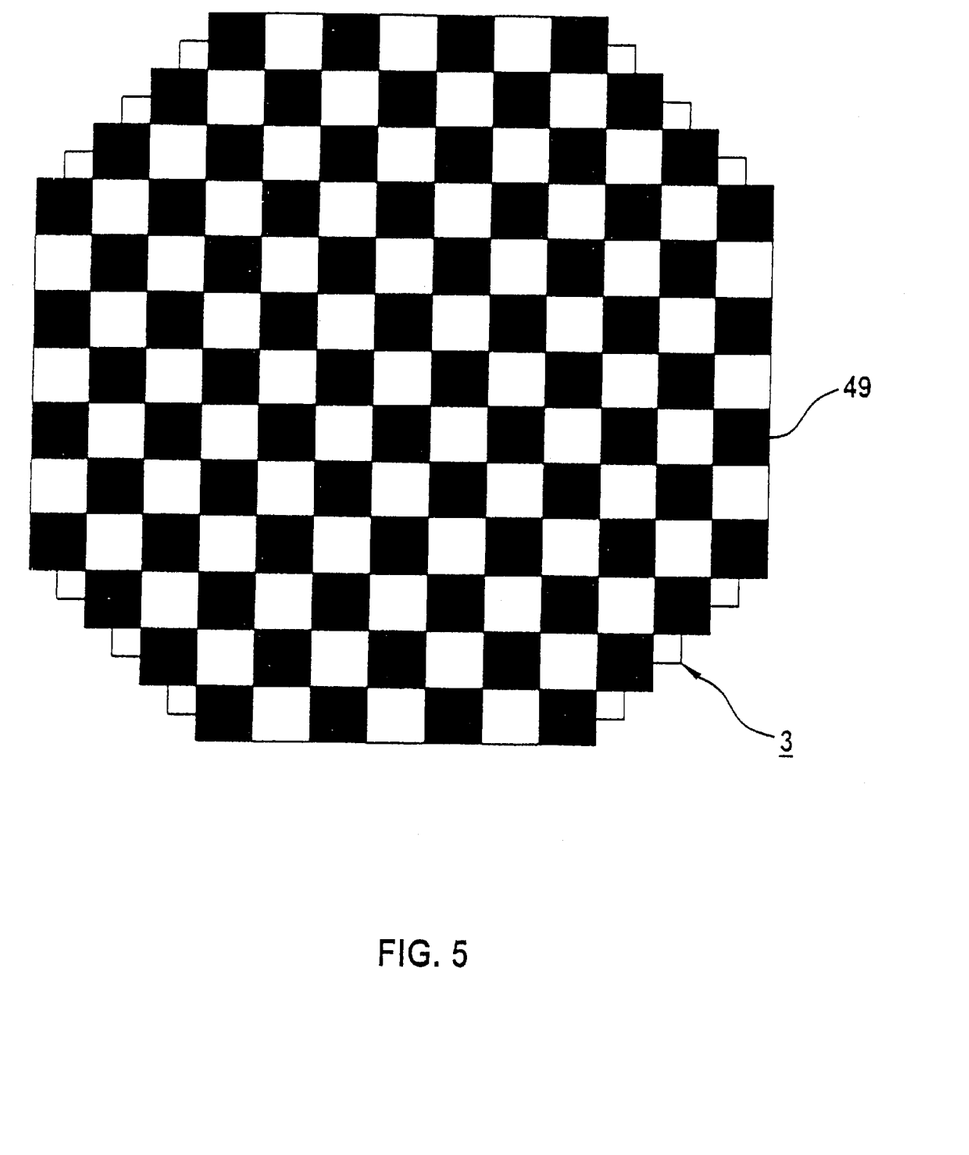
FIG. 5 is a diagram of a cross-sectional area of a reactor core with control rods moved out according to a regular checkerboard pattern.

FIG. 5 shows the situation where all the control rods belong to one of the two "colors" of a complete checkerboard pattern 49 and the core contains 69 "white" and 76 "black" control rods. The condition b) allows all the "black" control rods to be drawn simultaneously or successively in groups as long as the "white" rods remain in the initial position. When all the "black" control rods have reached the final position, therefore, more than $m_o$ control rods have moved out of the reactor core and the reactor power output rises to more than 5% of the rated power output. The monitoring unit 17 then annuls all the blocking zones 47 (FIG. 4) around the moved-out control rods, so that the remaining control rods can be moved out, for example in order to achieve a higher power output of the reactor core. The condition a) remains effective even in this power output mode.

However, the constraint of condition a) ensures that, first, only some "black" control rods which are not diagonally adjacent to one another begin to be moved out. The "black" control rods are therefore subdivided into groups, which as a rule contain at least four control rods, and are selected in groups, and it may be advantageous in each case to draw out the control rods only in steps and to change the group division after a few steps.

Figure 6:
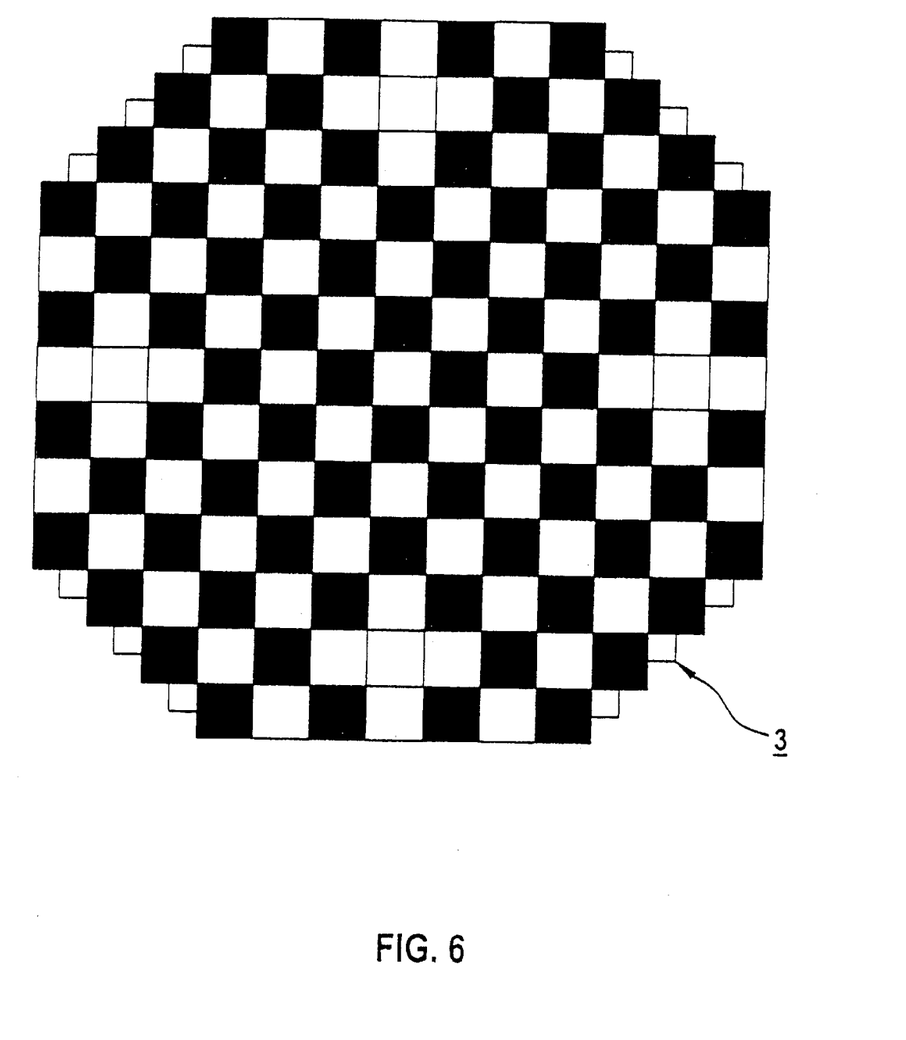
FIG. 6 is a diagrammatic pattern of a cross-sectional area of a reactor core in another configuration with moved-out control rods.

FIG. 6 shows a configuration which is activated at the end of the start-up mode and in which, first, some "black" control rods have likewise begun to be moved out, but a subgroup of four control rods is considered not to have moved out completely, whether because the due feedback of at least one control rod position is absent and therefore the further activation of a corresponding subgroup of drives has been dispensed with or because a movement program without these control rods is more favorable. In order to reach the limit value LIM of the reactor power output reliably during start-up, it is sufficient if 65 control rods are moved out completely (that is to say, $m_o$=65), so that the start-up operation could also have been begun with "white" control rods and, even then, dispensing with some control rods would not have prejudiced the transition into the power output mode.

If the entire core is covered with a two-color checkerboard pattern, the number of squares of one color is not always equal to the number of squares of the other color, but one color is in the minority. Said minimum number $m_o$ can be selected in such a way that, when the rods of this "minority color" are moved out, approximately four rods are not required and, nevertheless, the number of rods capable of being moved out according to condition b) reaches the value $m_o$. Where FIGS. 3 to 7 are concerned, $m_o$=65 is therefore possible, the complete outward movement of 65 control rods resulting in the fact that the reactor is heated appreciably, an excursion is no longer possible for physical reasons and the power output rises in the control range provided for normal operation. Even if it should be necessary in an individual case to transfer to a control sequence in which specific subgroups of control rods are not moved out completely (see FIG. 6), there are still always in practice, even for $m<m_o$, configurations which lead to an increase in power output to the limit value LIM for normal operation. This allows high flexibility.

Figure 7:
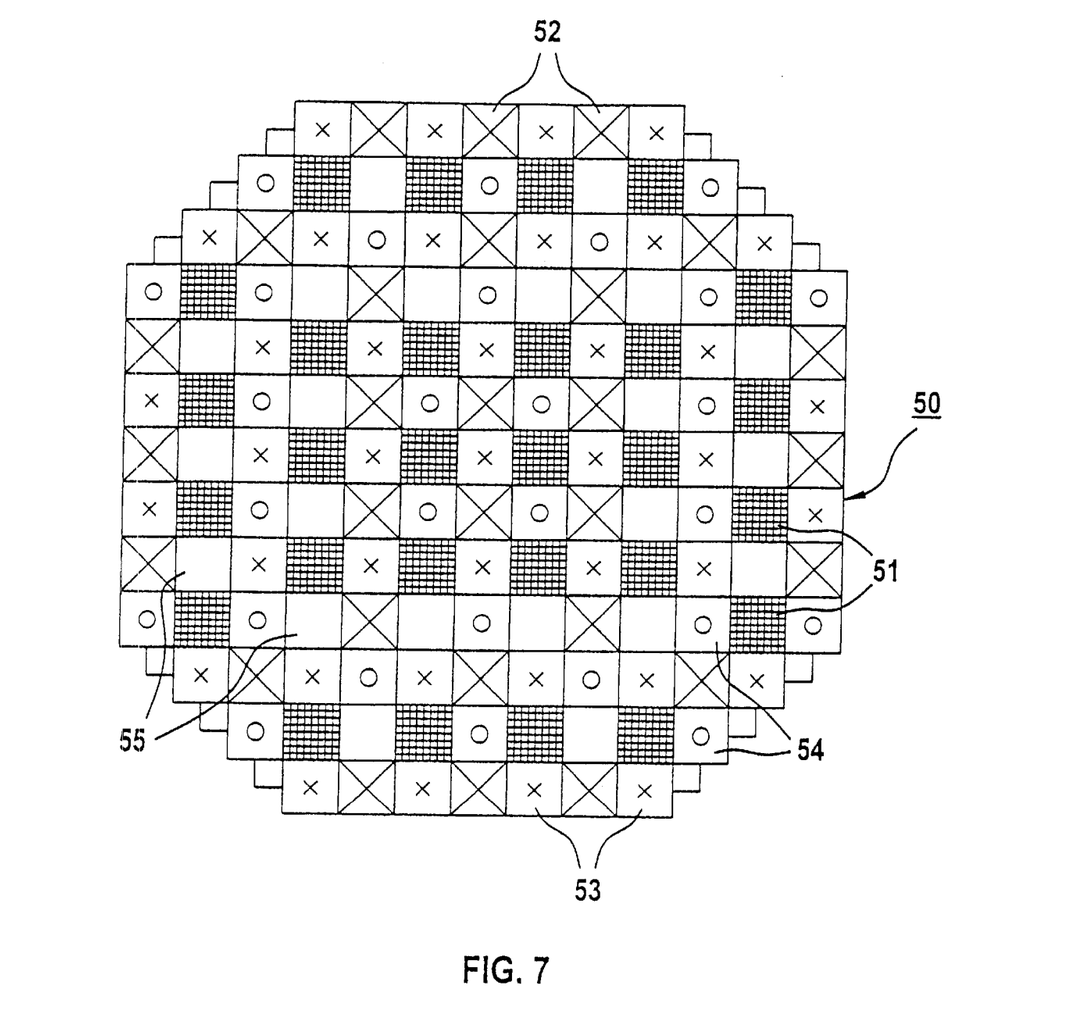
FIG. 7 is a diagram of a core cross section obtained according to a different pattern.

As an example of a configuration which differs from a uniform two-color checkerboard pattern and is admissible according to the criteria mentioned, FIG. 7 shows a core 50 in which a group of control rods 51 is already moved into the final position and, when a group of control rods 52 is being moved out, the power output of the reactor already exceeds the value LIM=5% of the rated power output, as may be gathered from the predetermined distribution of the individually different reactivity of the fuel elements used in this basic situation. FIG. 7 shows that a blocking zone is maintained around each of the control rods 51 and 52 during start-up and consists in each case of the four directly adjacent control rods which in each case are all still held in the initial position.

In order to bring the reactor to full power output, the control rods 53, 54 and 55 which have still remained in the initial position are subdivided into three further groups. It is evident that, within each individual group, a further blocking zone is maintained around each control rod and consists in each case of all the control rods which are directly or diagonally adjacent, all these adjacent control rods belonging to other groups. Consequently, in each case, all the control rods of a group can be moved simultaneously.

I claim:

1. A method of monitoring an operation of a boiling water reactor with a reactor core, the reactor core having control rods distributed about a cross section thereof in a pattern corresponding to a two-color checkerboard with squares of different color each assigned a control rod, the checkerboard representing a regular grid with square meshes, each of the control rods being movable via a respective control rod drive from an initial position, in which the control rod is moved completely in the reactor core, into a final position, in which the control rod is moved completely out of the reactor core, and the method comprises:

during a start-up, activating at most some control rod drives and interlocking other control rod drives and using a monitoring device for the interlocking of the control rod drives permitting one of a first configuration, in which simultaneously moved control rods are assigned to squares of different color in the checkerboard pattern, and a second configuration, in which substantially half the control rods are moved at least partially out of the reactor core and fully moved-in control rods are assigned to squares of different color, and preventing violation of the following rules:
a) the control rod drives of the control rods which are directly adjacent one another and the control rod drives of the control rods which are diagonally adjacent one another must not be activated simultaneously; and
b) for each control rod no longer in the initial position, the drives of the directly adjacent control rods must not be activated before a predetermined minimum number of control rods are in the final position or the reactor power output reaches an upper limit predetermined for the start-up.

2. The method according to claim 1, which comprises blocking all the control rod drives upon an infringement of at least one of the rules a) and b).

3. The method according to claim 1, which comprises setting the minimum number to no more than half the total number of all the control rods.

4. The method according to claim 1, which comprises, during start-up, monitoring a region of the reactor core comprising at least a plurality of control rods such that the control rods are assigned to two groups, the groups being distributed over the region according to the differently colored squares of a checkerboard, and monitoring the drives of the control rods to ensure that the drives of one group remain interlocked and only selected drives of the other group are activated.

5. The method according to claim 1, which comprises enabling the control rod drives in groups.

6. The method according to claim 1, which comprises setting the upper limit to approximately 5% of a rated power output of the reactor.

7. The method according to claim 1, which comprises, upon an occurrence of criterion b), interlocking the directly adjacent control rods only in the event of a displacement of a control rod of more than approximately 5 cm in relation to an initial position thereof.

* * * * *